(12) United States Patent
Lunt

(10) Patent No.: US 9,399,863 B2
(45) Date of Patent: Jul. 26, 2016

(54) LOW FLUSH TOILET SYSTEM

(71) Applicant: Azzurra Imports Pty Ltd, Brisbane (AU)

(72) Inventor: Stephen Lunt, Eagle Farm (AU)

(73) Assignee: Azzurra Imports Pty Ltd (AU)

( * ) Notice: Subject to any disclaimer, the term of this patent is extended or adjusted under 35 U.S.C. 154(b) by 0 days.

(21) Appl. No.: 14/767,084

(22) PCT Filed: Mar. 21, 2014

(86) PCT No.: PCT/AU2014/000302
§ 371 (c)(1),
(2) Date: Aug. 11, 2015

(87) PCT Pub. No.: WO2014/153594
PCT Pub. Date: Oct. 2, 2014

(65) Prior Publication Data
US 2016/0002905 A1    Jan. 7, 2016

(30) Foreign Application Priority Data

Mar. 25, 2013   (AU) ................................. 2013201917

(51) Int. Cl.
| | | |
|---|---|---|
| *E03D 1/00* | (2006.01) | |
| *E03D 11/08* | (2006.01) | |
| *E03D 11/06* | (2006.01) | |
| *E03D 11/18* | (2006.01) | |
| *E03F 11/00* | (2006.01) | |
| *E03F 9/00* | (2006.01) | |

(52) U.S. Cl.
CPC  *E03D 11/08* (2013.01); *E03D 1/00* (2013.01); *E03D 11/06* (2013.01); *E03D 11/18* (2013.01); *E03F 9/00* (2013.01); *E03F 11/00* (2013.01)

(58) Field of Classification Search
CPC .......................................................... E03D 5/01
USPC ..................................................... 4/300–442
See application file for complete search history.

(56) References Cited

U.S. PATENT DOCUMENTS

| | | |
|---|---|---|
| 4,672,690 A | 6/1987 | Sigler |
| 5,218,726 A | 6/1993 | Jaeckels et al. |
| 5,651,148 A | 7/1997 | Bayot |

(Continued)

FOREIGN PATENT DOCUMENTS

| | | |
|---|---|---|
| CA | 2809669 A1 | 1/2012 |
| EP | 0441239 A1 | 8/1991 |

(Continued)

OTHER PUBLICATIONS

PCT International Search Report and Written Opinion for International Application No. PCT/AU2014/000302 dated Jun. 2, 2014.

*Primary Examiner* — Lori Baker
(74) *Attorney, Agent, or Firm* — Ziolkowski Patent Solutions Group, SC

(57) ABSTRACT

A toilet system comprising an ultra-low flush toilet, the toilet having a cistern, a bowl including a rim comprising a channel adapted to receive water from the cistern or a flushing device upon flushing of the toilet, the channel having a plurality of apertures therein through which water entering the channel from the cistern or the flushing device flows into the bowl, and wherein a greater concentration of the apertures per unit length of the rim is provided in an area of the rim positioned over a region of the bowl that requires additional water for cleaning, the toilet further comprising a toilet outlet through which waste material is discharged from the toilet, a waste material collection vessel in fluid communication with the toilet outlet via a toilet outlet conduit, the waste material collection vessel having a collection portion adapted to collect at least a portion of the waste material discharged from the toilet and a discharge portion through which at least a portion of the waste material in the collection portion is periodically discharged into a waste material disposal vessel, wherein the quantity of the waste material discharged from the discharge portion is sufficient to ensure that substantially all of the quantity of the waste material discharged enters the waste material disposal vessel.

8 Claims, 3 Drawing Sheets

(56) References Cited

U.S. PATENT DOCUMENTS 6,216,285 B1 4/2001 Olin
6,415,457 B2 7/2002 Schmucki

FOREIGN PATENT DOCUMENTS

| WO | 2004020753 | A2 | 11/2004 |
| WO | 2009115750 | A2 | 9/2009 |
| WO | 2012008051 | A1 | 1/2012 |

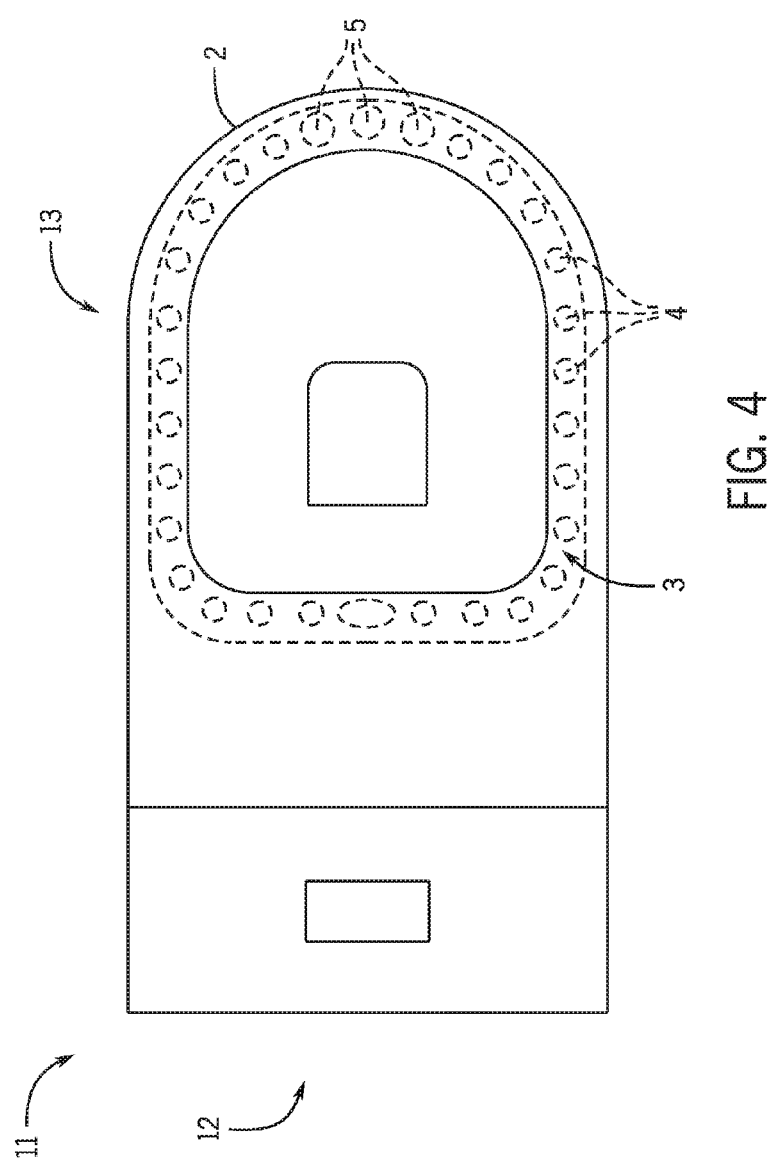

LOW FLUSH TOILET SYSTEM

TECHNICAL FIELD

The present invention relates to a toilet system having low water usage. In particular, the present invention relates to a low flush toilet. More specifically, the present invention relates to an ultra-low flush toilet system that includes a collection vessel that minimises water usage and the likelihood of drain and sewer blockages.

BACKGROUND ART

In recent times, an increasing awareness of the importance of water conservation has led to attempts to reduce the amount of water used when flushing toilets.

While a number of so-called "low flush" toilet systems have been adopted for use, it has been found that these systems can suffer from the disadvantage that a reduction in the amount of water used when flushing the toilet can lead to a build-up of waste material in sewer pipes. This in turn can lead to corrosion in pipes and increased levels of noxious and flammable gases.

In cities in which these problems are experienced, specifically formulated chemicals (such as Drano) have been used in an attempt to clear the build-up waste material from sewer pipes, and to reduce the unpleasant odour associated with the waste material. However, the use of chemicals has its own drawbacks, including the cost and environmental impact.

There would be an advantage, therefore, if it were possible to provide a toilet system that used relatively low quantities of water, but that reduced or eliminated the build-up of waste material in sewer pipes.

It will be clearly understood that, if a prior art publication is referred to herein, this reference does not constitute an admission that the publication forms part of the common general knowledge in the art in Australia or in any other country.

SUMMARY OF INVENTION

The present invention is directed to low flush toilet system (and particularly an ultra-low flush toilet system), which may at least partially overcome at least one of the abovementioned disadvantages or provide the consumer with a useful or commercial choice.

With the foregoing in view, the present invention in one form, resides broadly in an ultra-low flush toilet system comprising a toilet, the toilet having a cistern, a bowl including a rim comprising a channel adapted to receive water from the cistern or a flushing device upon flushing of the toilet, the channel having a plurality of apertures therein through which water entering the channel from the cistern or the flushing device flows into the bowl, and wherein a greater concentration of the apertures per unit length of the rim is provided in an area of the rim positioned over a region of the bowl that requires additional water for cleaning, the toilet further comprising a toilet outlet through which waste material is discharged from the toilet, a waste material collection vessel in fluid communication with the toilet outlet via a toilet outlet conduit, the waste material collection vessel having a collection portion adapted to collect at least a portion of the waste material discharged from the toilet and a discharge portion through which at least a portion of the waste material in the collection portion is periodically discharged into a waste material disposal vessel, wherein the quantity of the waste material discharged from the discharge portion is sufficient to ensure that substantially all of the quantity of the waste material discharged enters the waste material disposal vessel.

The toilet may be of any suitable form, and the exact nature of the toilet is not critical to the invention. Preferably, however, the toilet comprises a cistern and a bowl in fluid communication with one another. In a preferred embodiment of the invention, the toilet is a low flush toilet. A skilled addressee will understand that the term "low flush toilet" refers to a toilet in which reduced quantities of water are used when flushing the toilet. While the exact quantities of water required to flush a "low flush toilet" are not critical, it is envisaged that a "low flush toilet" is one in which approximately 4.5 liters of water are used for a full flush, and approximately 3 liters of water are used for a half flush.

In a preferred embodiment of the invention, the toilet may be an ultra-low flush toilet. A skilled addressee will understand that the term "ultra-low flush toilet" refers to a toilet in which the quantities of water used when flushing the toilet are lower than those used in a low flush toilet. While the exact quantities of water required to flush an "ultra-low flush toilet" are not critical, it is envisaged that an "ultra-low flush toilet" is one in which approximately 3 liters of water are used for a full flush, and approximately 2 liters of water are used for a half flush.

Providing a toilet that serves as an ultra-low flush toilet may be achieved using any suitable technique. However, in a preferred embodiment of the invention, providing an ultra-low flush toilet may be achieved through an adjustment to one or more outlet valves in the cistern. Through an adjustment of the position of the valve seat of the one or more outlet valves, the quantity of water used to flush a toilet may be adjusted. It will be understood that water flowing through the one or more outlet valves flows into the toilet bowl, either directly or via a rim.

In some embodiments of the invention, it may be necessary to remove the existing one or more outlet valves in a toilet cistern if the valves are unable to be adjusted to provide the low quantities of water used in an ultra-low flush toilet system. In this situation, once existing valves have been removed, new valves capable of achieving the low water flow required in an ultra-low flush toilet system may be fitted to the cistern. The valves may be capable of adjustment to achieve the water usage required in an ultra-low flush toilet system. Alternatively, the valves may not be capable of adjustment and may instead be fixed at a position that ensures that the amount of water flowing through the valves achieves that required in an ultra-low flush toilet system. For instance, if the toilet is of a pedestal or wall-hung variety, the toilet may be provided with a flushing device that is connected to a water supply, such as a reticulated water supply (including a reticulated potable water supply) or a water storage tank or the like. When a user flushes the toilet, the flushing device may be actuated to discharge water to flush the toilet. Preferably, the buttons, levers, etc used to flush the toilet are associated with the flushing device in such a manner that flushing the toilet actuates the flushing device to release a predetermined volume of water into the toilet. Actuation of the flushing device may be achieved using any suitable technique, such as, but not limited to, mechanical techniques (for instance, push rods and linkages), pneumatic techniques (for instance, hoses and bellows) or electrical or electronic techniques (for instance, using mains power, a generator, or one or more batteries), or a combination thereof. In some embodiments of the invention, the flushing device may comprise a flush valve or a mains pressure flushing device.

It is envisaged that the toilet bowl will further include a rim, and a skilled addressee will understand that the rim of the toilet bowl will be adapted to direct water from the cistern into the bowl when the toilet is flushed. Typically, a toilet rim comprises a channel extending substantially entirely around the entire circumference of the toilet bowl, allowing water from the cistern to enter the bowl around the entire circumference of the bowl. However, in some embodiments, providing an ultra-low flush toilet may also be achieved through the use of a rim adapted to increase the efficiency with which the toilet is flushed by directing water from the cistern to specific areas within the bowl, meaning that less water is required to flush the toilet.

In a preferred embodiment of the invention, shown in FIG. 4, the rim 2 comprises a channel 3 adapted to receive water from the cistern 12, the channel 3 including a plurality of apertures 4.5 therein through which water entering the channel 3 from the cistern 12 may flow. It is envisaged that the water will enter the bowl 13 after flowing through the plurality of apertures 4.5. Preferably, the plurality of apertures 4.5 extends around substantially the entire circumference of the rim 2. It will be understood that the size, shape and number of the apertures 4.5 in the rim 2 may be varied as required. Further, the apertures 4.5 may be spaced apart any suitable distance from one another around the rim 2. The spacing between the apertures 4.5 may be consistent around the rim 2, or may vary (for instance, a greater concentration of apertures 4.5 per unit length of the rim 2 may be provided in an area of the rim 2 positioned over a region of the bowl that requires more water for cleaning). Alternatively, a greater concentration of apertures 4.5 per unit length of the rim 2 may be provided in an area of the rim 2 in which an increased flow of water may result in increased flushing of the toilet 11.

In an alternative embodiment of the invention, the rim 2 may be provided with a plurality of apertures 4.5 of varying sizes. For instance, certain areas of the rim 2 (in which only small amounts of water may typically be required to clean the bowl 13) may be provided with one or more relatively small apertures 2, whereas other areas of the rim 2 (in which larger amounts of water may typically be required to clean the bowl 13) may be provided with larger apertures 5. The larger apertures 5 may include one or more channels that extend partway around the circumference of the rim 2.

The toilet outlet may be of any suitable form. Preferably, the toilet outlet is associated with the toilet bowl. In a preferred embodiment, the toilet outlet is connected to one or more toilet outlet conduits (such as pipes or channels) that direct waste material away from the toilet bowl upon flushing of the toilet. The toilet outlet conduit may be connected directly to the waste material collection vessel or may be connected to the waste material collection vessel by one or more intermediate conduits.

The toilet outlet conduit may be of any suitable form, and may include a conduit having a tortuous path, including a water trap (such as an S-bend, P-trap or the like, or a combination thereof). Alternatively, the outlet conduit may not have a tortuous path, and may comprise a substantially straight or curved section of pipe.

In embodiments of the invention in which a water trap is present, it is preferred that the volume of water within the trap is minimal, while still complying with the relevant Standards.

In some embodiments of the invention, the waste material collection vessel may receive waste material from a plurality of devices. The devices may include one or more toilets, basins, sinks, showers, baths, bidets or the like, or a combination thereof. It is envisaged that, in this embodiment of the invention, each of the plurality of devices may be provided with an outlet conduit through which waste material is removed from the device. The outlet conduits may all be connected directly to the waste material collection vessel. Alternatively, the waste material from each of the devices may be combined prior to entering the waste material collection vessel.

It will be understood that in embodiments of the invention in which waste material from a plurality of devices enters the waste material collection vessel, waste material may not be received from every device simultaneously. For instance, it is envisaged that waste material may only be discharged from some devices (such as toilets or showers etc.) periodically or intermittently.

The waste material collection vessel may be of any suitable size, shape or configuration. Preferably, the waste material collection vessel comprises one or more inlets through which waste material is received from one or more devices in fluid communication with the waste material collection vessel. Most preferably, at least one of the devices is a toilet.

The toilet and the waste material collection vessel may be positioned any suitable distance from one another. Preferably, however, the toilet and the waste material collection vessel are positioned close enough to one another so as to minimise or eradicate the risk of waste material build up or blockages of waste material in the conduits connecting the toilet and the waste material collection vessel.

It will be understood that the distance between the toilet and the waste material collection vessel may vary depending on the number of devices in fluid communication with the waste material collection vessel, the frequency of use of the devices, the composition of the waste material and so on. In a preferred embodiment of the invention, however, the horizontal distance between the toilet and the waste material collection vessel is no more than 10 meters. More preferably, the horizontal distance between the toilet and the waste material collection vessel is no more than 8 meters. Most preferably, the horizontal distance between the toilet and the waste material collection vessel is no more than 6 meters.

It will be understood that the vertical distance between the toilet and the waste material collection vessel is not critical to the working of the invention. Typically, the waste material collection vessel will be located below ground level (or at least below floor level), and the toilet will be located at a location that is vertically above the location of the waste material collection vessel. However, the actual vertical distance between the toilet and the waste material collection vessel may vary depending on the number of storeys in a building and so on.

Preferably, each of the one or more inlets is in fluid communication with the collection portion of the waste material collection vessel, such that all of the waste material entering the waste material collection vessel is collected in the collection portion. The collection portion may be of any suitable size, shape and configuration, although in a preferred embodiment of the invention, the collection portion is adapted to periodically release a quantity of the waste material collected therein. More preferably, the quantity of material released is sufficient to ensure that substantially all of the waste material released reaches the waste material disposal vessel, thereby preventing a build-up of waste material in the discharge conduit or conduits interconnecting the waste material collection vessel and the waste material disposal vessel. It will be understood that a build-up of waste material can lead to corrosion in the discharge conduit or conduits, can cause blockages in the conduit or conduits.

It is envisaged that the collection portion will be housed substantially entirely within a housing defining the exterior of the waste material collection vessel. The collection portion may be formed integrally with the remainder of the waste material collection vessel, or may be formed separately therefrom and adapted for fixed or temporary connection thereto.

Preferably, the collection portion is in fluid communication with the discharge portion of the waste material collection vessel. It is envisaged that the discharge portion may include one or more outlets through which waste material may be discharged from the waste material collection vessel. Preferably, the one or more outlets are in fluid communication with the discharge conduit or conduits interconnecting the waste material collection vessel and the waste material disposal vessel.

The periodic discharge of waste material from the waste material collection vessel may be achieved using any suitable technique. For instance, the waste material collection vessel may be adapted to discharge the waste material at certain predetermined intervals of time. Alternatively, particularly if the volume of waste material received by the waste material collection vessel is not consistent over time, the waste material may be discharged periodically from the waste material collection vessel when the level of waste material collected in the collection portion reaches a predetermined level. In this way, a consistent volume of waste material is discharged from the waste material collection vessel every time waste material is released.

In embodiments of the invention in which the waste material may be discharged periodically from the waste material collection vessel when the level of waste material collected in the collection portion reaches a predetermined level, the predetermined level may be determined using any suitable technique. For instance, the waste material collection vessel may be provided with one or more sensors adapted to measure the level, volume or mass of waste material in the collection portion. When the one or more sensors sense that the level, volume or mass of the waste material has reached a predetermined value, a portion of the waste material may be released, such as by actuating one or more valves, gates or the like.

In a preferred embodiment, the collection portion may be adapted to hold a predetermined mass or volume of waste material before automatically discharging at least a portion of the waste material into the discharge portion. This may be achieved using any suitable technique. For instance, the collection portion associated with biasing means that bias the collection portion into a first orientation. Once sufficient waste material is collected in the collection portion, the volume or mass of the waste material may be sufficient to overcome the bias of the biasing means, moving the collection portion into a second orientation in which at least a portion of the waste material is discharged through the discharge portion.

In an alternative embodiment, the collection portion may be adapted for pivotal movement between a collection orientation and a discharge orientation, and the pivotal movement may be actuated by the mass or volume of waste material in the collection portion reaching a predetermined level.

In this embodiment of the invention, the collection portion comprises a vessel including one or more walls defining a volume therein. In use, it is envisaged that the waste material will be retained in the volume defined by the one or more walls until such time as the volume of waste material in the collection portion reaches a predetermined level.

It will be understood that the predetermined volume or mass of the waste material required to actuate the discharge of waste material from different waste material collection vessels may vary depending on the number of devices in fluid communication with the waste material collection vessel and the volume and type of waste material discharged from each device. Consideration may also be given to how long collected waste material can be retained in the waste material collection vessel prior to discharge, and if any adverse health, safety or environmental effects may be experienced by retaining waste material prior to discharge for certain periods of time. For instance, a volume of waste material required to actuate the discharge of the waste material from a waste collection storage vessel associated with a single toilet may be much smaller than the volume of waste material required to actuate the discharge of waste material from a waste collection storage vessel associated with multiple toilets.

Preferably, however, the predetermined volume or mass of the waste material required to actuate the discharge of waste material from the waste material collection vessel will remain constant regardless of the number of devices in fluid communication with the waste material collection vessel and the volume and type of waste material discharged from each device.

In some embodiments, a source of water may be located at or adjacent the waste material collection vessel. The source of water may be used to add water to the waste material discharged from the waste material collection vessel to assist in preventing a build-up of waste material in the discharge conduit due to inadequate amounts of water being discharged from the waste material collection vessel. The source of water may actuate only when waste material is discharged from the waste material collection vessel, may operate continuously, or may operate periodically independent of when waste material is discharged. Alternatively, one or more sensors may be provided to determine the ratio of solids to liquids in the waste material. In this embodiment, the source of water may actuate when the ratio of solids to liquids in the waste material reaches a predetermined level.

In some embodiments of the invention, the waste material collection vessel may include one or more venting outlets through which gases generated by, or associated with, the waste material may be vented (such as to the atmosphere). In situations in which the waste material collection vessel is located below ground level, it is envisaged that one or more conduits (such as risers) may be connected to the one more venting outlets. Preferably, the one or more conduits are connected to the one or more venting outlets at a first end thereof, while a second end of the one of more conduits is located above ground level so that gases vented through the one or more conduits may be released to the atmosphere.

The waste material collection vessel may be fabricated from any suitable material. Preferably, however, the waste material collection vessel may be fabricated from plastic, such as, but not limited to, PVC.

The waste material disposal vessel may be of any suitable type, or may be utilised in any suitable drainage. For instance, the waste material disposal vessel may comprise a sewer or a septic tank, or may operate within a sewer or a septic tank environment.

The waste material may be of any type. For instance, the waste material may include water, grey water, human or animal bodily wastes (including solid material, such as faecal matter), organic wastes (such as vegetable matter or waste foodstuffs), paper waste (such as toilet paper), effluent or a combination thereof. Preferably, the waste material comprises a slurry of solid material and water.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 4 illustrates a top view of the toilet of the toilet system of FIG. 1 according to an embodiment of the present invention.

DESCRIPTION OF EMBODIMENTS

Figure 1:
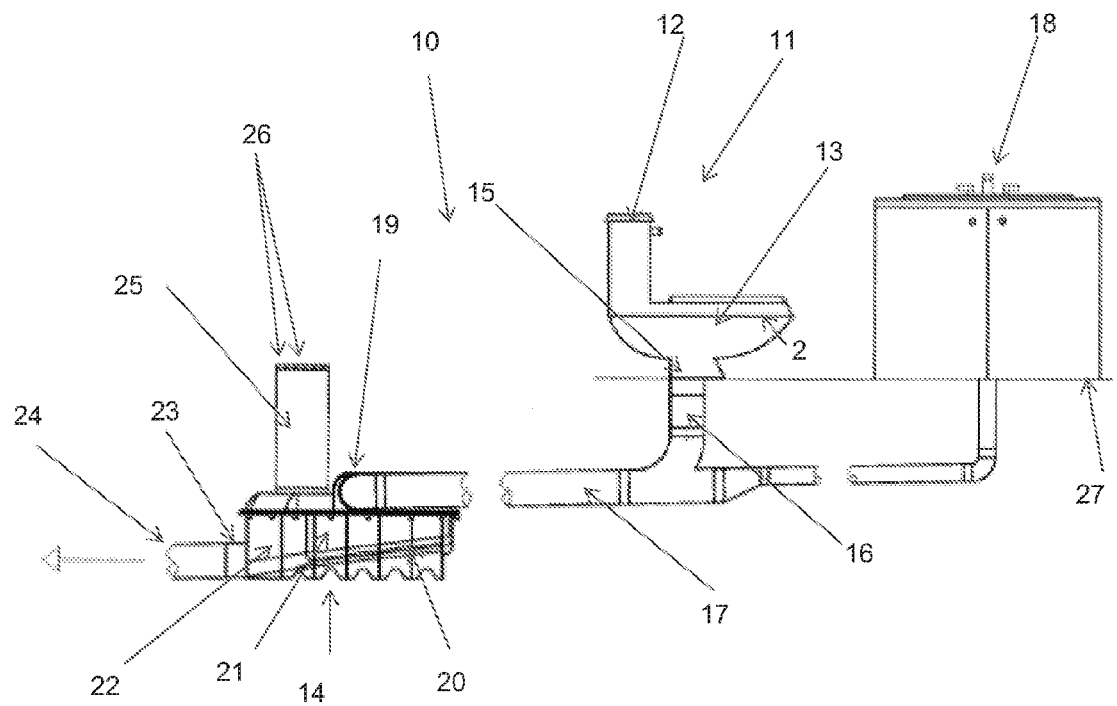
FIG. 1 illustrates a schematic view of a toilet system according to an embodiment of the present invention.

In FIG. 1 there is illustrated a schematic view of a toilet system 10 according to an embodiment of the present invention. The toilet system 10 comprises a toilet 11 having a cistern 12 and a bowl 13 in fluid communication with a waste material collection vessel 14.

The bowl 13 includes a toilet outlet 15 in a lower portion thereof through which waste material is discharged from the toilet 11. The toilet outlet 15 is connected to a toilet outlet pipe 16. In the embodiment of the invention shown in FIG. 1, the toilet outlet pipe 16 is connected to an intermediate pipe 17 that receives waste material from the toilet 11 and a basin 18 located upstream of the toilet 11.

Waste material from the toilet 11 and basin 18 flows through the intermediate pipe 17 into the inlet 19 of the waste material collection vessel 14. Waste material is then collected in a container 21 located within the collection portion 20, the container 21 being adapted to tip and discharge at least a portion (or, in some embodiments, all) of its contents when the quantity of waste material in the container 21 reaches a predetermined level.

When the level of waste material in the container 21 reaches the predetermined level, the container tips so as to discharge waste material into the discharge portion 22 of the waste material collection vessel 14. The discharge portion 22 includes an outlet 23 connected to a discharge conduit 24 that directs waste material discharged from the waste material collection vessel 14 to a waste material disposal vessel, such as a sewer or septic tank.

In the embodiment of the invention shown in FIG. 1, the waste material collection vessel 14 is provided with a riser 25 extending upwardly from a venting outlet (obscured). The upper end of the riser 25 (which includes a plurality of exhaust openings 26) extends to above ground level 27 so that any gases vented from the riser 25 are released to the atmosphere.

There are numerous advantages to the toilet system 10 of the present invention. Firstly, the use of the waste material collection vessel 14 allows the toilet 11 to operate as an ultra-low flush toilet, meaning that the volume of water used to flush the toilet 11 is relatively low. This means that the toilet system 10 of the present invention is significant more environmentally friendly than existing toilet systems.

Figure 2:
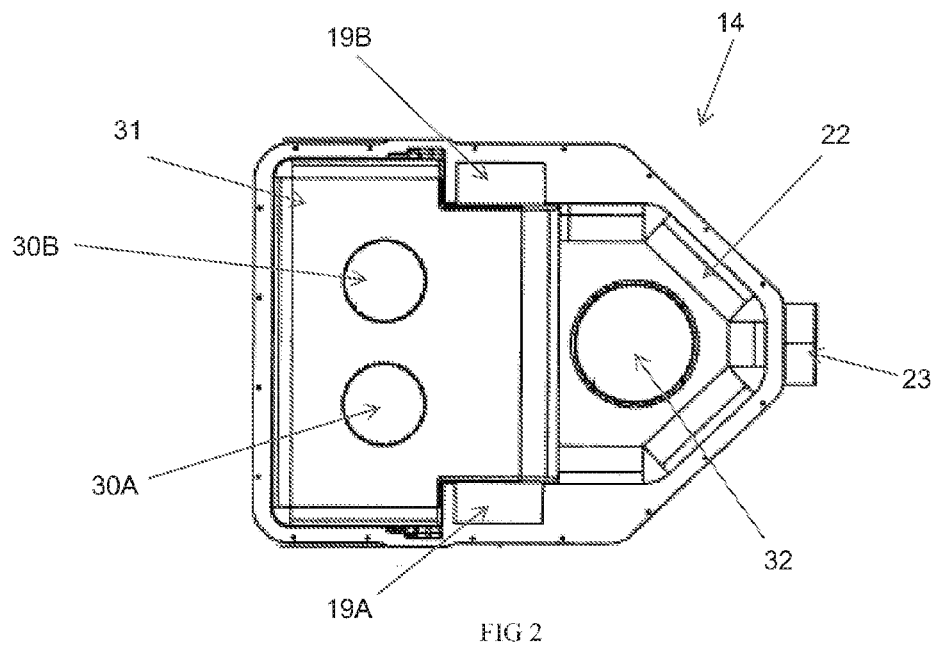
FIG. 2 illustrates a plan view of a waste material collection vessel according to an embodiment of the present invention.

In FIG. 2 there is shown a plan view of a waste material collection vessel 14 according to an embodiment of the present invention. The waste material collection vessel 14 includes a pair of inlets 19A, 19B that each receive waste material from one or more devices (toilets or the like). Two further inlets 30A, 30B each adapted to receive waste material from one or more devices are provided in an upper surface of the housing 31. It will be understood that not all of the inlets may be used, and any suitable number of the inlets may be used depending how many devices the waste material collection vessel 14 receives waste material from.

The waste material collection vessel 14 also includes an 23 through which waste material is discharged from the waste material collection vessel 14. The discharge portion 22 of the waste material collection vessel 14 tapers towards the outlet 23 to assist in directing the flow of waste material toward the outlet 23 and to reduce the likelihood of waste material remaining in the vessel 14.

The waste material collection vessel 14 further includes a venting outlet 32 to which a riser (not shown) may be connected, and through which gases can be removed from the vessel 14. The venting outlet 32 may also serve as an inspection port during maintenance or repair of the waste material collection vessel 14.

Figure 3:
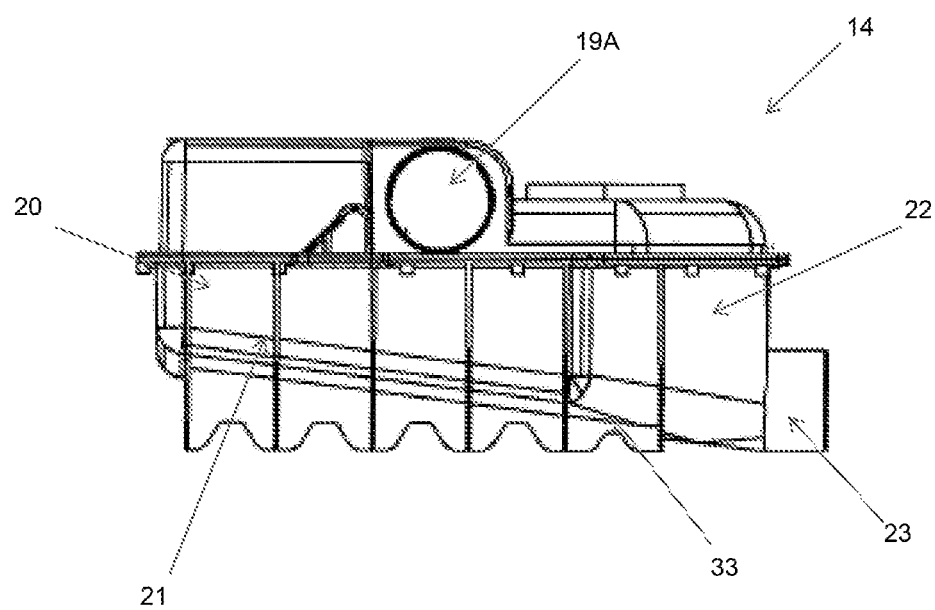
FIG. 3 illustrates a side elevation and partial cross-section of a waste material collection vessel according to an embodiment of the present invention.

In FIG. 3 there is illustrated a side elevation and partial cross-section of the waste material collection vessel 14. In this Figure it may be seen that material entering the vessel 14 through inlet 19A is received in a container 21 located in the collection portion 20 of the vessel 14. When the amount of waste material in the container 21 reaches a predetermined level, the container tips downwardly at the front edge thereof, discharging a volume of waste material towards the outlet 23. It may be seen that the floor 33 of the discharge portion 22 slopes towards the outlet 23 to ensure that the discharged waste material leaves the vessel 14 through the outlet 23.

Once the waste material has been discharged, the container 21 returns to the position shown in FIG. 3, until such time as the amount of waste material in the container 21 again reaches the predetermined level and a further volume of waste material is discharged.

In addition, the use of the waste material collection vessel 14 means that problems associated with the build-up of waste material (leading to blockages, unpleasant odours and corrosion) can be minimised or even eliminated by ensuring that a sufficient volume of waste material is discharged from the waste material collection vessel to avoid blockages and build-up of waste material in downstream pipes.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A toilet system comprising an ultra-low flush toilet, the toilet having a cistern, a bowl including a rim comprising a channel adapted to receive water from the cistern or a flushing device upon flushing of the toilet, the channel having a plurality of apertures therein through which water entering the channel from the cistern or the flushing device flows into the bowl, and wherein a greater concentration of the apertures per unit length of the rim is provided in an area of the rim positioned over a region of the bowl that requires additional water for cleaning, the toilet further comprising a toilet outlet through which waste material is discharged from the toilet, a waste material collection vessel in fluid communication with the toilet outlet via a toilet outlet conduit, the waste material collection vessel having a collection portion adapted to collect at least a portion of the waste material discharged from the toilet and a discharge portion through which at least a portion of the waste material in the collection portion is periodically discharged into a waste material disposal vessel, wherein the quantity of the waste material discharged from the discharge portion is sufficient to ensure that substantially all of the quantity of the waste material discharged enters the waste material disposal vessel.

2. A toilet system according to claim 1 wherein approximately 3 liters of water is used for a full flush, and approximately 2 liters of water is used for a half flush.

3. A toilet system according to claim 1 wherein the waste material collection vessel receives waste material from a plurality of devices.

4. A toilet system according to claim 1 wherein the discharge of waste material from the waste material collection vessel is actuated when the quantity of waste material in the collection portion reaches a predetermined level.

5. A toilet system according to claim 1 wherein the waste material disposal vessel comprises a sewer or septic tank.

6. A toilet system according to claim 1 wherein the waste material collection vessel further comprises one or more venting outlets through which gases generated by, or associated with, the waste material are vented.

7. A toilet system according to claim 1 wherein the horizontal distance between the toilet and the waste material collection vessel is no more than 6 meters.

8. A toilet system according to claim 1 wherein the toilet outlet conduit is connected to the waste material collection vessel by one or more intermediate conduits.

* * * * *